United States Patent [19]
Uemura et al.

[11] Patent Number: 5,857,905
[45] Date of Patent: Jan. 12, 1999

[54] AIR CONDITIONING APPARATUS FOR VEHICLE

[75] Inventors: Yukio Uemura; Kazushi Shikata; Kenji Suwa, all of Kariya, Japan

[73] Assignee: Denso Corporation, Kariya, Japan

[21] Appl. No.: 955,165

[22] Filed: Oct. 21, 1997

[30] Foreign Application Priority Data

Oct. 22, 1996 [JP] Japan .................................... 8-279552

[51] Int. Cl.⁶ ..................................................... B60H 1/32
[52] U.S. Cl. ................................ 454/121; 165/42; 165/43
[58] Field of Search .................................... 454/121, 156; 165/42, 43

[56] References Cited

U.S. PATENT DOCUMENTS 4,779,672  10/1988  Seikou et al. ...................... 165/42 X
4,802,405   2/1989  Ichitani et al. ..................... 165/42 X
5,390,728   2/1995  Ban ..................................... 165/42 X

*Primary Examiner*—Harold Joyce
*Attorney, Agent, or Firm*—Harness, Dickey & Pierce, PLC

[57] ABSTRACT

An air conditioning apparatus includes an air conditioning case having therein first and second air passages partitioned from each other. First and second fans are respectively disposed in the first and second air passages, and an outer diameter of the first fan is smaller than that of the second fan. Therefore, an air volume relative to a total pressure in the first fan is greatly changed as compared with the second fan. Thus, when an operation mode is switched from a foot air mode to a foot/defroster air mode or from the foot/defroster air mode to the foot air mode, an opening degree of a defroster door is changed slightly.

9 Claims, 5 Drawing Sheets

5,857,905

AIR CONDITIONING APPARATUS FOR VEHICLE

CROSS-REFERENCE TO RELATED APPLICATION

This application is related to and claims priority from Japanese Patent Application No. Hei. 8-279552 filed on Oct. 22, 1996, the contents of which are hereby incorporated by reference.

BACKGROUND OF THE INVENTION

1. Field of the Invention

The present invention relates to an air conditioning apparatus for a vehicle, which includes an air conditioning case having therein a first air passage and a second air passage partitioned from each other and introduces outside air and inside air into the first air passage and the second air passage, respectively.

2. Description of Related Art

Conventionally, an air conditioning apparatus for a vehicle is disclosed in JP-A-62-29411. In the conventional air conditioning apparatus, there are formed a first air passage for introducing outside air and a second air passage for introducing inside air, and first and second fans are disposed respectively in the first and second air passages and are driven by a motor. Further, a defroster air passage for blowing conditioned air toward an inner surface of a windshield of the vehicle is provided at a downstream air side of the first air passage, and a foot air passage for blowing conditioned air toward a foot side of a passenger in the passenger compartment of the vehicle is provided at a downstream air side of the second air passage. The defroster air passage and the foot air passage are respectively opened and closed by a defroster switching door and a foot switching door. Further, the first air passage and the second air passage communicate with each other at a downstream air side thereof. The foot switching door is formed so that the first air passage and the second air passage are entirely partitioned from each other by the foot switching door when the foot switching door opens the foot air passage.

The inventors of the present invention have studied the conventional air conditioning apparatus. As a result, in a double laminar mode, when an operation mode is switched from a foot air mode where a ratio of an air volume flowing in the first air passage and an air volume flowing in the second air passage is approximately 1/9 or 2/8 to a foot/defroster air mode where the ratio of air volumes is approximately 5/5, or the operation mode is switched from the foot/defroster air mode to the foot air mode, an opening degree of the defroster switching door is greatly changed (rotated) so that the ratio of air volumes is changed. That is, because the first fan and the second fan are driven by the same motor, the ratio of the air volumes is not adjusted by controlling rotational speeds of the first and second fans. Thus, a rotational opening degree of the defroster switching door becomes large when the defroster switching door is driven by a link mechanism, or a rotational amount of a servo motor becomes large when the defroster switching door is driven by the servo motor, for example.

SUMMARY OF THE INVENTION

In view of the foregoing problems, it is an object of the present invention to provide an air conditioning apparatus for a vehicle in which an opening degree of a defroster switching door is slightly changed when an operation mode is switched from a foot air mode to a foot/defroster air mode or from the foot/defroster air mode to the foot air mode.

According to the present invention, a first fan and a second fan are set in such a manner that a variation of a volume of outside air, flowing through a first air passage, relative to a total pressure of the first fan is larger than that of inside air, flowing through said second air passage, relative to a total pressure of the second fan. Therefore, when an operation mode is switched from a foot air mode to a foot/defroster air mode or from the foot/defroster air mode to the foot air mode, an opening degree of a defroster door is changed slightly.

Preferably, the first fan has a diameter smaller than that of the second fan. Therefore, an air volume relative to a total pressure in the first fan is greatly changed as compared with the second fan.

More preferably, the first fan has a height higher than that of the second fan. Therefore, an air volume relative to a total pressure in the first fan is greatly changed as compared with the second fan.

Still more preferably, the first fan has an outlet angle smaller than that of the second fan. Therefore, an air volume relative to a total pressure in the first fan is greatly changed as compared with the second fan.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

A preferred first embodiment of the present invention is described hereinafter with reference to the accompanying drawings.

Figure 1:
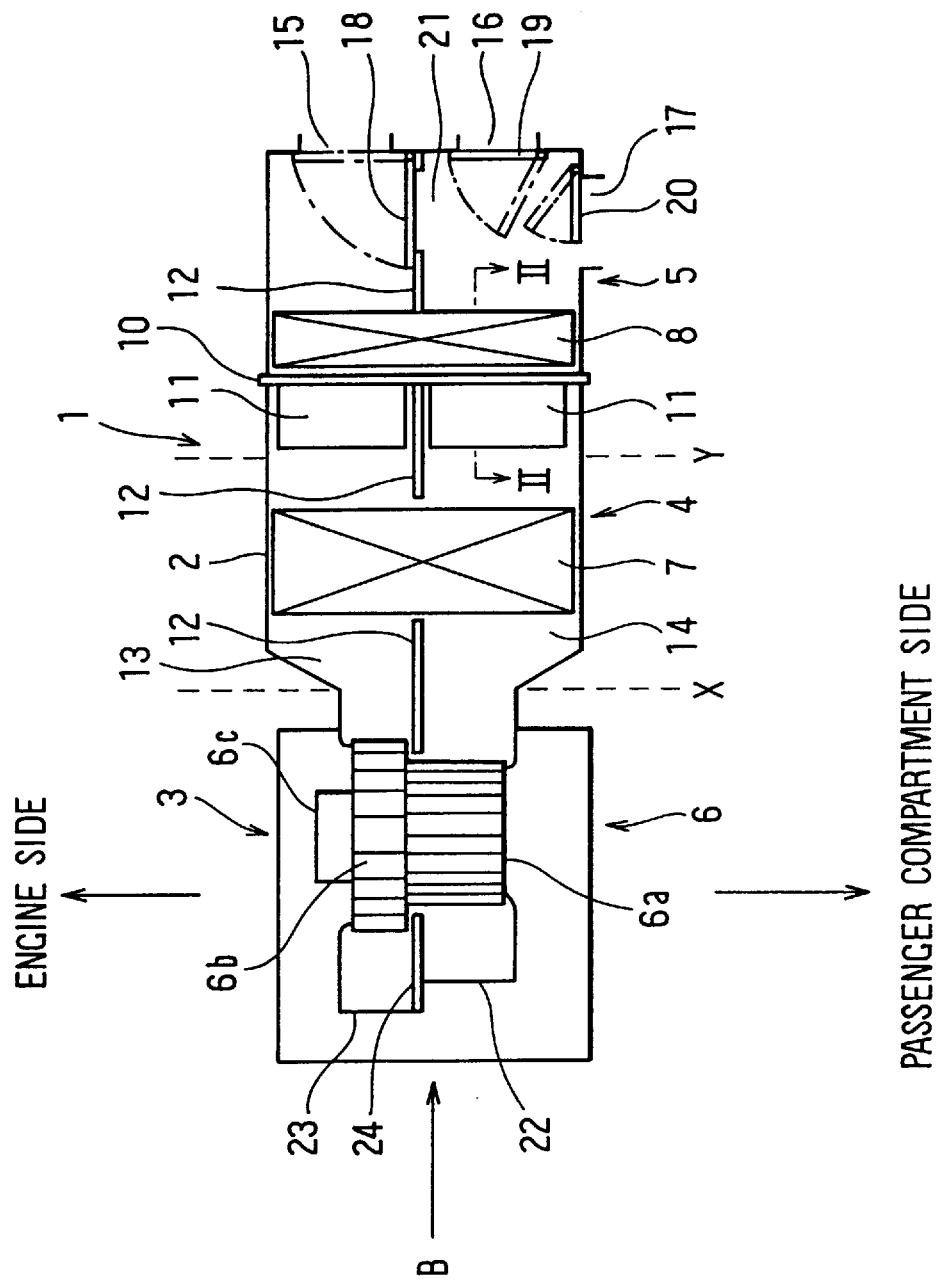
FIG. 1 is a schematic diagram showing an entire construction of an air conditioning apparatus for a vehicle according to a first embodiment of the present invention.

An air conditioning apparatus 1 is mounted on a vehicle in such a manner that the upper part in FIG. 1 corresponds to the front side of the vehicle (i.e., engine side); the lower part in FIG. 1 corresponds to the rear side of the vehicle (i.e., passenger compartment side); and the right-left direction in FIG. 1 corresponds to the width direction of the vehicle. The air conditioning apparatus 1 includes an air conditioning case 2 for forming an air passage for introducing conditioned air into a passenger compartment of the vehicle.

The air conditioning case 2 is made of resin material such as polypropylene and is constructed such that an inside/outside air switching box 3, a cooler unit 4 and a heater unit 5 are connected to one another in order. In FIG. 1, the broken lines X and Y represent the connection portions.

The inside/outside air switching box 3 sucks at least one, or both, of the inside and outside airs into the air conditioning case 2 and includes therein an air blower 6 for blowing air. The inside/outside air switching box 3 and the air blower 6 will be described later with reference to FIG. 3.

A refrigerant evaporator 7 for cooling air passing therethrough is disposed within the cooler unit 4 to entirely close the air passage in the air conditioning case 2. The refrigerant evaporator 7 constitutes a part of a well-known refrigeration cycle. The refrigerant cycle further includes a compressor for compressing a refrigerant by the driving force of the engine of the vehicle, a condenser for condensing and liquefying the compressed refrigerant, and a pressure reducer for reducing pressure of the condensed and liquefied refrigerant, and the like.

Figure 2:
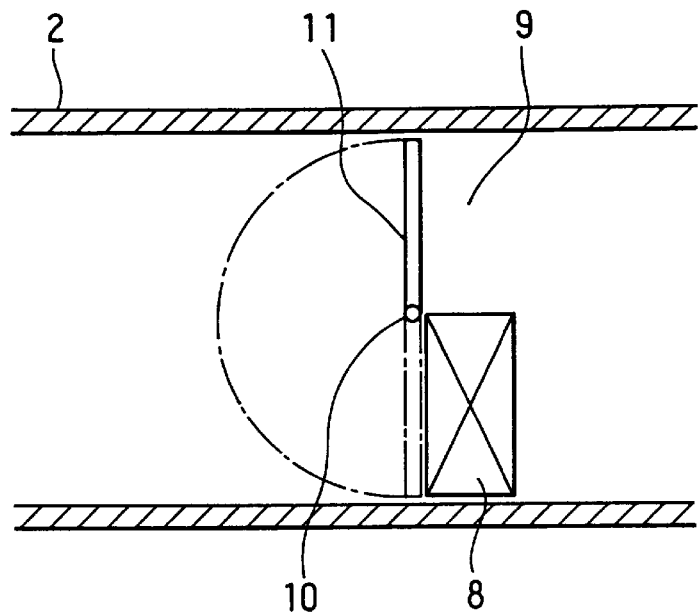
FIG. 2 is a cross-sectional view taken along line II—II in FIG. 1.

A heater core 8 for re-heating the cool air having passed through the refrigerant evaporator 7 is disposed in the heater unit 5. As shown in FIG. 2 which is a cross-sectional view taken along line II—II in FIG. 1, the heater core 8 is a heat exchanger which is provided in the air conditioning case 2 to form a bypass passage in which cool air flows, for bypassing the heater core 8. Cooling water for cooling the engine flows within the heater core 8 and heats the cool air by using the cooling water as a heater source.

A rotary shaft 10 is rotatably provided within the air conditioning case 2 at an upstream air side of the heater core 8. Plate-like air mixing doors 11 are integrally connected to the rotary shaft 10 so that the plat surfaces of the air-mixing doors 11 is coplaner with each other. Further, a servo motor (not shown) is connected to the rotary shaft 10.

By rotating the rotary shaft 10, the air mixing doors 11 are integrally rotated between a solid line position and a chain line position in FIG. 2. That is, the air mixing doors 11 adjust a ratio between an amount of cool air passing through the heater core 8 and an amount of cool air passing through the bypass passage 9 according to stop positions of the air mixing doors as shown in FIG. 2, thereby adjusting a temperature of air blown into the passenger compartment of the vehicle.

The cooler unit 4 and the heater unit 5 are connected to each other by connection means such as a claw engagement or screw member. As shown in FIG. 1, a first air passage 14 and a second air passage 13 are partitioned from each other by a partitioning wall 12 extending substantially in a vertical direction in FIG. 1. The refrigerant evaporator 7, the heater core 8 and the rotary shaft 10 are disposed in such a manner as to extend over both of the first air passage 13 and the second air passage 14.

A foot opening portion 15, a defroster opening portion 16 and a face opening portion 17 are formed at the most downstream air end of the air conditioning case 2.

A foot duct (not shown) is connected to the foot opening portion 15, and conditioned air introduced into the foot duct is blown out from a foot air outlet located at a downstream end of the foot duct toward the foot side of a passenger in the passenger compartment.

A defroster duct (not shown) is connected to the defroster opening portion 16, and conditioned air introduced into the defroster duct is blown out from a defroster air outlet located at a downstream end of the defroster duct toward an inner surface of the front windshield of the vehicle.

A center face duct and a side face duct (not shown) are connected to the face opening portion 17. Conditioned air introduced into the center face duct is blown out from a center face air outlet located at a downstream end of the center face duct toward the upper half of the body of a passenger in the passenger compartment. On the other hand, conditioned air introduced into the side face duct is blown out from a side face air outlet located at a downstream end of the side face duct toward side windshields of the vehicle.

A foot door 18, a defroster door 19 and a face door 20 are provided respectively at upstream air side positions of the opening portions 15–17. The foot door 18 opens or closes an air passage leading to the foot duct, the defroster door 19 opens or closes an air passage leading to the defroster duct, and the face door 20 opens or closes an air passage leading to the center face duct.

The doors 18–20 are connected to one another by a link mechanism (not shown), and the link mechanism is driven by a servo motor (not shown). That is, by operating the link mechanism with the servo motor, each door 18–20 are moved so that each operation mode as described later may be obtained.

An air passage leading to the side face duct is not opened or closed by the doors 18–20. An air outlet grill (not shown) is provided near the side face air outlet, and the air passage leading to the side face duct is opened or closed by the air outlet grill. A passenger manually opens or closes the side face air outlet through the air outlet grill.

The partitioning wall 12 discontinues at a position at an upstream air side of the opening portions 15–17 and a downstream air side of the heater core 8. A communication opening 21 communicating between the first air passage 14 and the second air passage 13 is formed at the discontinued portion. The communication opening 21 is opened or closed by the foot door 18.

By switching the doors 18–20, a face air mode, a bi-level air mode, a foot air mode or a foot/defroster air mode can be set. Next the operation modes will be described below.

(1) FACE AIR MODE

In the face air mode, the face door 20 fully opens the face opening portion 17, the defroster door 19 fully closes the defroster opening portion 19, and the foot door 18 fully closes the foot opening portion 19 and opens the communication opening 21. Therefore, air conditioned by the air mixing door 11 is only blown toward the face opening portion 17.

(2) BI-LEVEL AIR MODE

In the bi-level air mode, the face door 20 opens the face opening portion 17, and the defroster door 19 closes the defroster opening portion 19. Further, the foot door 18 opens the foot opening portion 15 and closes the communication opening 21. Therefore, the conditioned air flowing in the first air passage 14 is blown toward the face opening portion 17, and the conditioned air flowing in the second air passage 13 is blown toward the foot opening portion 15.

(3) FOOT AIR MODE

In the foot air mode, the face door 20 fully closes the face opening portion 17, and the defroster door 19 slightly opens the defroster opening portion 19. Further, the foot door 18 fully opens the foot door opening portion 15 and closes the communication opening 21. Therefore, the conditioned air flowing in the first air passage 14 is blown toward the defroster opening portion 16, and the conditioned air flowing in the second air passage 13 is blown toward the foot opening portion 15. In this case, a ratio of an amount of conditioned air blown from the foot opening portion 15 to an amount of conditioned air blown from the defroster opening portion 19 is approximately 8/2.

(4) FOOT/DEFROSTER AIR MODE

In the foot/defroster air mode, the face door 20 closes the face opening portion 17, and the defroster door 19 approximately fully opens the defroster opening portion 16. Further, the foot door 18 fully opens the foot opening portion 15 and closes the communication opening 21. Therefore, the conditioned air flowing in the first air passage 14 is blown toward the defroster opening portion 17, and the conditioned air flowing in the second air passage 13 is blown toward the foot opening portion 15. In this case, a ratio of an amount of conditioned air blown from the foot opening portion 15 to an amount of conditioned air blown from the defroster opening portion 19 is approximately 5/5.

(4) DEFROSTER AIR MODE

In the defroster air mode, the face door 20 fully closes the face opening portion 17, and the defroster door 19 approximately fully opens the defroster opening portion 16. Further, the foot door 18 fully closes the foot opening portion 15 and opens the communication opening 21. Therefore, air conditioned by the air mixing door 11 passes through both first and second air passages 13 and 14 and is blown toward the defroster opening portion 16.

Figure 3:
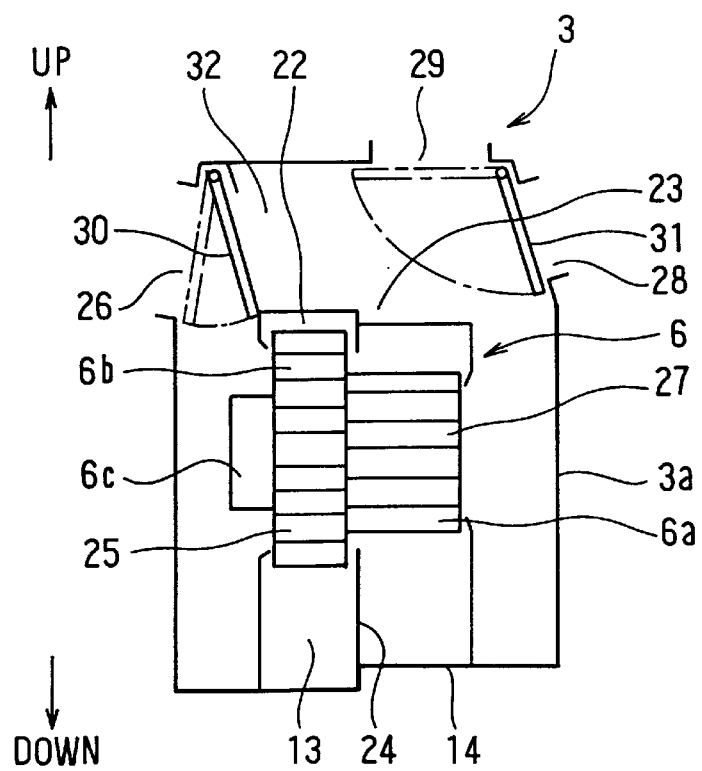
FIG. 3 is a perspective view when viewed from a direction indicated by an arrow B in FIG. 1.
Figure 4:
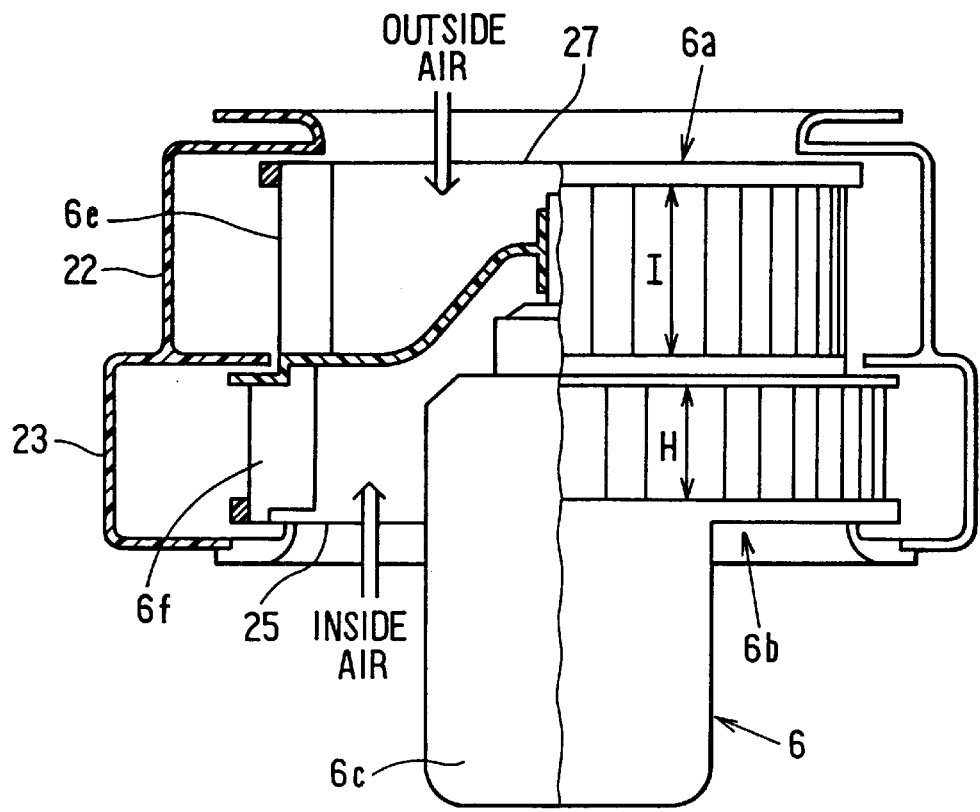
FIG. 4 is a partial sectional view showing an air blower in FIG. 3.

Next, the inside/outside air switching box 3 and the air blower 6 will be described with reference to FIGS. 3 and 4. FIG. 3 is a perspective view when viewed from a direction indicated by the arrow B in FIG. 1. FIG. 4 is a partial cross-sectional view showing the air blower 6 in FIG. 3.

As shown in FIG. 3, the inside/outside air switching box 3 includes an inside/outside air case 3*a* forming the most upstream air side of the air conditioning case 2 and the air blower 6 contained in the inside/outside air case 3*a*.

Figure 5:
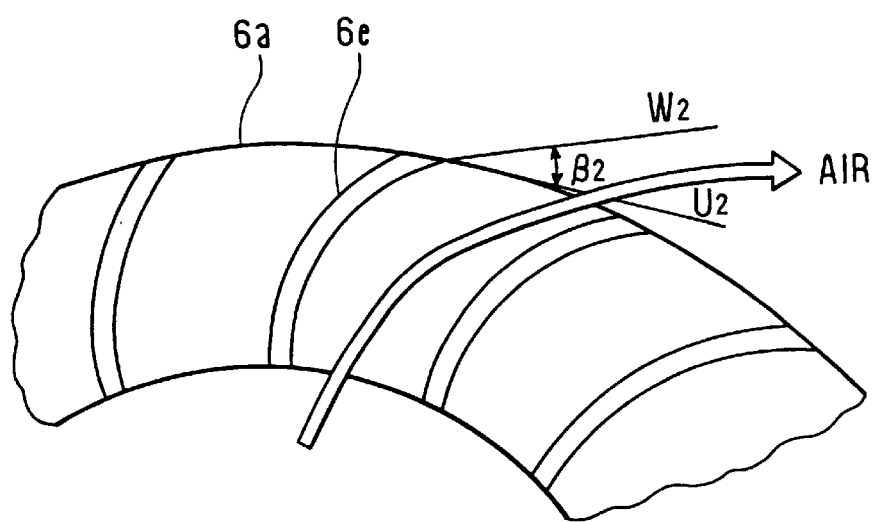
FIG. 5 is a diagrammatic view showing an outlet angle of a fan of the air blower.

The air blower 6 is disposed substantially at a center within the inside/outside air case 3*a*. The air blower 6 includes a first fan 6*a*, a second fan 6*b* and a blower motor 6*c* for driving and rotating the first and second fans 6*a* and 6*b*. In the first embodiment, each of the first and second fans 6*a* and 6*b* is a centrifugal multi-blades fan (e.g., sirocco fan). The first and second fans 6*a* and 6*b* respectively have first and second fan blades 6*e* and 6*f*, and each of the fans 6*a* and 6*b* is formed in a cylindrical shape. That is, the fan blades 6*e* and 6*f* are respectively arranged in circular shapes to form the cylindrical shaped first and second fans 6*a* and 6*b*. As shown in FIG. 5, an outlet angle (β2) of each fan is defined as an angle between a tangent (U2) of a fan end and a tangent (W2) of a blade surface at its end where air is sent outside. The outlet angle of each of the first and second fans 6*a* and 6*b* is set at 30°. The first fan 6*a* and the second fan 6*b* are integrally formed and the diameter of the second fan 6*b* is larger than that of the first fan 6*a*.

Further, as shown in FIG. 4, the blade height I of the first fan 6*a* is higher than the blade height H of the second fan 6*b*. The first and second fans 6*a* and 6*b* are respectively contained in scroll casing portions 22 and 23, and each of the scroll casing portions 22 and 23 has a bell-mouth shape. Terminal end portions (i.e., air outlet side) of the scroll casing portions 22 and 23 are communicated with the first air passage 14 and the second air passage 13, respectively.

On the other hand, within the inside/outside air case 3*a*, a first inside air suction port 28 is formed in correspondence with a suction inlet 27 of the first fan 6*a* and a second inside air suction port 26 is formed in correspondence with a suction inlet 25 of the second fan 6*b*. Further, an outside air suction port 29 is formed between the first inside air suction port 28 and the second inside air suction port 26. In the inside/outside air case 3*a*, there are provided a first suction port switching door 31 which opens or closes the first inside air suction port 28 and the outside air suction port 29 selectively and a second suction port switching door 30 which opens or closes the second inside air suction port 26.

The first suction port switching door 30 and the second suction port switching door 31 are respectively connected to servo motors (not shown) and are respectively rotated between a solid line position and a chain line position in FIG. 3 by the servo motors.

A communication passage 32 communicating between the suction inlet 25 and the first inside air suction port 28 or the outside air suction port 29 is formed in the inside/outside air case 3*a*. When fully opening the second inside air suction port 26 (i.e., the solid line position in FIG. 3), the second suction port switching door 30 fully closes the communication passage 32. When fully closing the second inside air suction port 26 (i.e., the chain line position in FIG. 4), the second suction port switching door 30 fully opens the communication passage 32.

In the first embodiment, a whole inside air mode in which only inside air is introduced into both of the first air passage 14 and the second air passage 13, a whole outside air mode in which only outside air is introduced into both of the first air passage 14 and the second air passage 13, and a double laminar mode in which inside air is introduced into the second air passage 13 and outside air is introduced into the first air passage 14 can be selected by the first and second suction port switching doors 30 and 31.

In the double laminar mode, it is necessary to close the communication opening 21 by the foot door 18, and therefore the foot opening portion 15 is opened. Thus, in the first embodiment, the double laminar mode can be used for the bi-level air mode, the foot air mode and the foot/defroster air mode.

When the operation mode is switched from the foot air mode to the foot/defroster air mode or from the foot/defroster air mode to the foot air mode, an opening degree of the defroster door 19 is adjusted while fully opening the foot opening portion 15 so that a predetermined air ratio can be set.

In the embodiment, the blade height I (e.g., 40 mm, in the embodiment) of the first fan 6*a* for blowing air into the first air passage 14 is higher than the blade height H (e.g., 35 mm, in the embodiment) of the second fan 6*b* for blowing air into the second air passage 13. The air volume relative to a total pressure of air to be blown from each fan is increased as increasing the fan height. Therefore, when the operation mode is switched from the foot air mode to the foot/defroster air mode or from the foot/defroster air mode to the foot air mode, the air volume flowing in the first air passage 14 is greatly changed even if the opening degree of the defroster door 19 is changed slightly.

In the first embodiment, an outer diameter of the first fan 6*a* is smaller than that of the second fan 6*b*.

Figure 6:
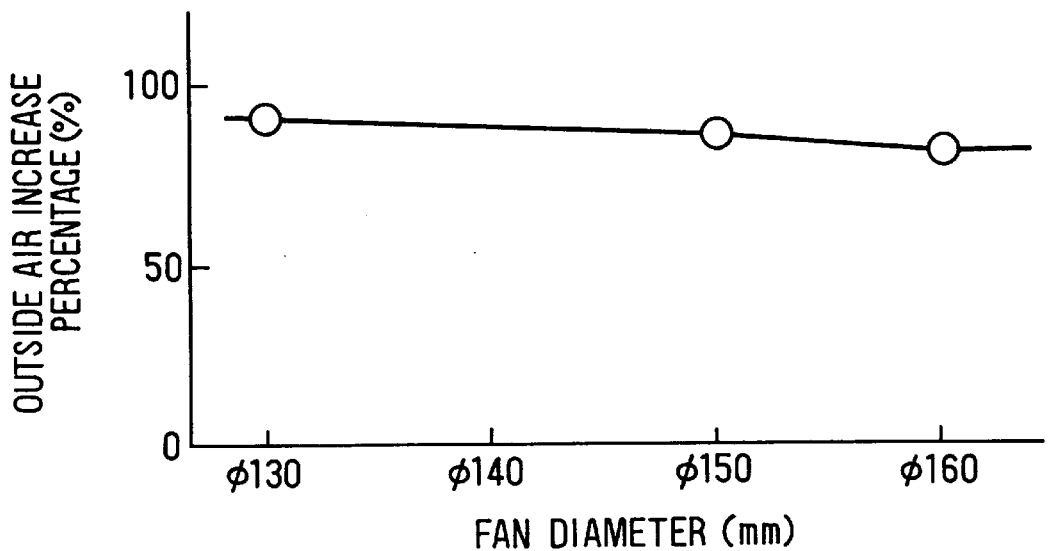
FIG. 6 is a graph showing the relationship between a fan diameter and an outside air increase percentage.

Therefore, when the opening degree of the defroster door 19 is changed slightly, the air volume flowing in the first air passage 14 is greatly changed. FIG. 6 shows the relationship between an outside air increase percentage and the fan diameter (i.e., outer diameter). Here, the outside air increase percentage (OAIP) is obtained according to the following equation (1).

$$OAIP(\%) = [V_{OA}(F/D) - V_{OA}(FOOT)]/V_{OA}(FOOT) \quad (1)$$

wherein $V_{OA}$ (F/D) shows outside air volume in the foot/defroster air mode, and $V_{OA}$ (FOOT) shows outside air volume in the foot air mode.

As shown in FIG. 6, the outside air increase percentage is increased as the fan diameter is decreased. That is, when the diameter of the first fan 6a is made smaller than that of the second fan 6b, a variation of the air volume in the first air passage 14 becomes larger when the operation mode is switched from the foot air mode to the foot/defroster air mode or from the foot/defroster air mode to the foot air mode. In the embodiment, the outer diameter of the first fan 6a is 140 mm, and the outer diameter of the second fan 6b is 160 mm.

Figure 7:
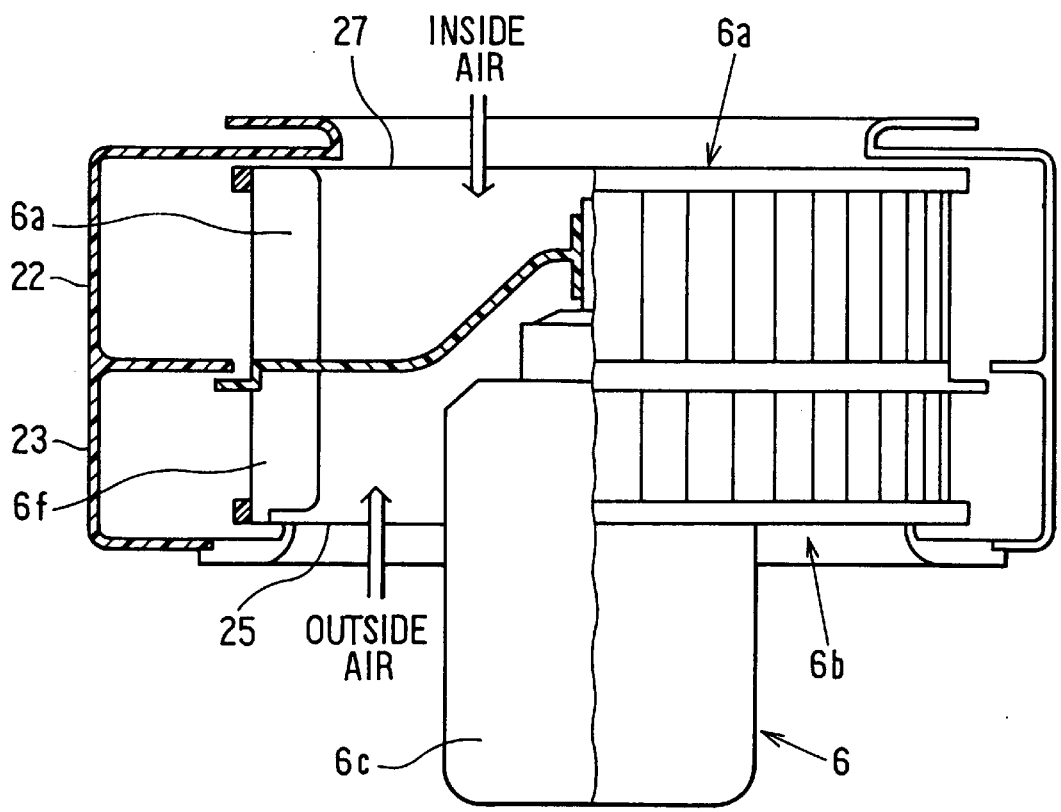
FIG. 7 is a partial sectional view showing an another air blower.

In the above-described first embodiment, the outer diameter of the first fan 6a is smaller than that of the second fan 6b. However, as shown in FIG. 7, the outer diameters of the first and second fans 6a and 6b may be equal. Here, the diameter of each fan is 160 mm, and the outlet angle and the fan height are similar to the first embodiment.

Figure 8:
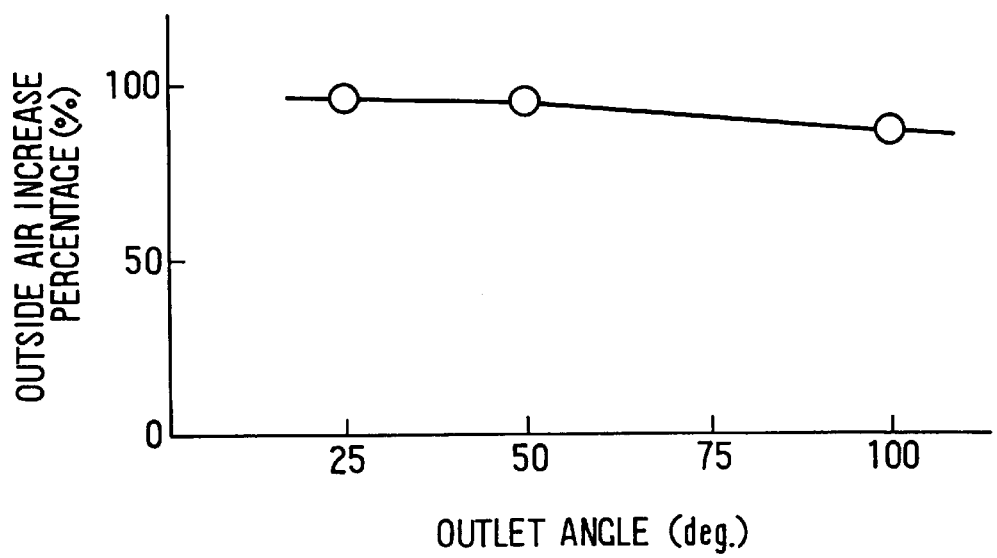
FIG. 8 is a graph showing the relationship between a fan outlet angle and an outside air increase percentage.

In the above-described first embodiment, each outlet angle of the first fans 6a and 6b is set at 30°. However, the outlet angle of the first fan 6a may be smaller than that of the second fan 6b. For example, the outlet angle of the first fan 6a may be set at 30°, the outlet angle of the second fan 6b may be set at 40°. FIG. 8 shows the relationship between the outlet angle and the outside air increase percentage. As shown in FIG. 8, the outside increase percentage is increased as the outlet angle becomes smaller. Therefore, by adjusting the outlet angles of the first and second fans 6a and 6b, the same effect as the first embodiment can be obtained.

Figure 9:
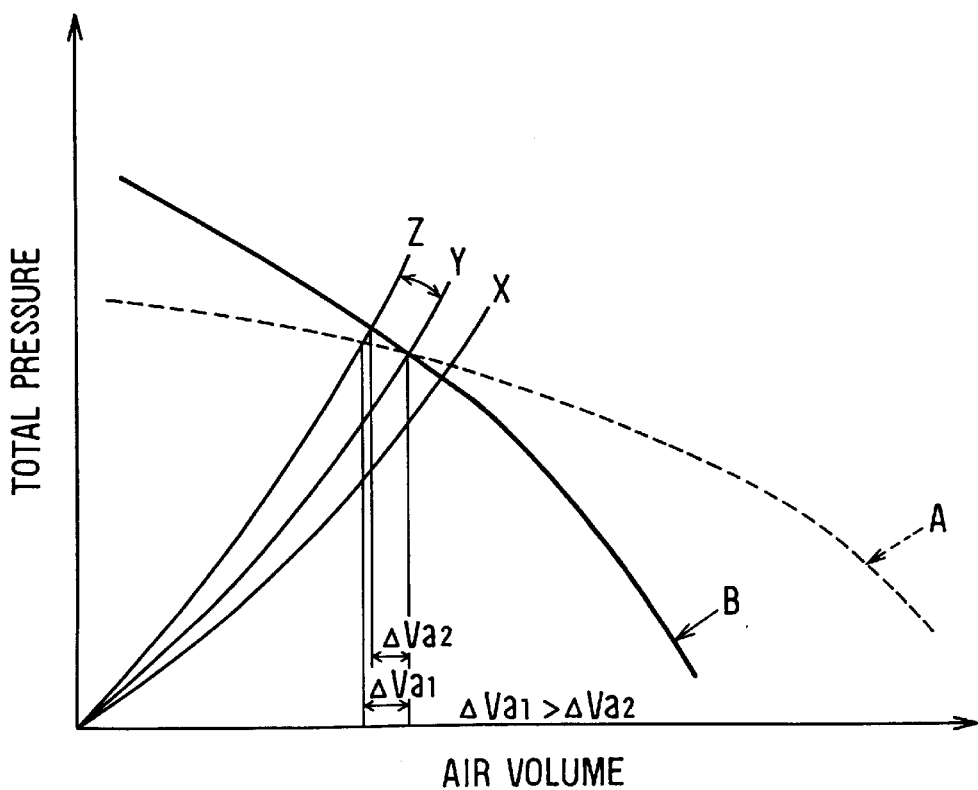
FIG. 9 is a graph showing the relationship between an air volume and a total pressure of air to be blown from a fan.

FIG. 9 is a graph showing the relationship between an air volume and a total pressure of air blown from each fan. In FIG. 9, X shows an air flow resistance characteristic of the second air passage 13 (i.e., inside air) in the foot air mode or the foot/defroster air mode, Y shows an air flow resistance characteristic of the first air passage 14 (i.e., outside air) in the foot/defroster air mode, and Z shows an air flow resistance characteristic of the first air passage 14 in the foot air mode. Further, in FIG. 9, graph A shows the relationship between the air volume and the total pressure in the first fan 6a, and graph B shows the relationship between the air volume and the total pressure in the second fan 6b. When the operation mode is changed between the foot air mode and the foot/defroster air mode as shown by Y and Z in FIG. 9, a variation (ΔVa1) of an air volume relative to the total pressure in the first fan 14 (A) is larger than a variation (ΔVa2) of an air volume relative to the total pressure in the second fan 14 (B). Therefore, the air volume in the first air passage 14 is greatly increased when the opening degree of the defroster switching door is changed slightly.

Thus, by changing the outlet angles, the fan heights and the outer diameters of the first fan 6a and the second fan 6b, the variation of the air volume relative to the total pressure in the first fan 6a is set to a value larger than that in the second fan 6b.

Although the present invention has been fully described in connection with preferred embodiment thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioning apparatus for a vehicle having a passenger compartment, said air conditioning apparatus comprising:

an air conditioning case for forming an air passage, said air conditioning case having a first opening portion for blowing air toward an inner surface of a windshield of the vehicle and a second opening portion for blowing air toward a lower portion of the passenger compartment;

a partitioning member for partitioning said air passage into a first air passage for introducing outside air and a second air passage for introducing inside air;

a first fan in said first air passage, for blowing outside air with a total pressure toward the passenger compartment;

a second fan in said second air passage, for blowing inside air with a total pressure toward the passenger compartment;

a first switching door, rotatably disposed in said air conditioning case, for opening and closing said first opening portion; and a second switching door, rotatably disposed in said air conditioning case, for opening and closing said second opening portion, wherein:

said first switching door and said second switching door are rotated in such a manner that said first air passage and said second air passage are substantially partitioned from each other during an air outlet mode where said first switching door opens said first opening portion and said second switching door opens said second opening portion; and said first fan and said second fan are set in such a manner that a variation of a volume of outside air flowing through said first air passage, relative to the total pressure of said first fan, is larger than that of inside air flowing through said second air passage, relative to the total pressure of said second fan.

2. An air conditioning apparatus according to claim 1, wherein:

each of said first fan and second fan has a cylindrical shape; and said first fan has an outer diameter smaller than that of said second fan.

3. An air conditioning apparatus according to claim 2, wherein said first fan has a height higher than that of said second fan.

4. An air conditioning apparatus according to claim 3, wherein said first fan has an outlet angle smaller than that of said second fan.

5. An air conditioning apparatus according to claim 1, wherein:

said partitioning member has a communication portion proximate to said second opening portion, for communicating between said first air passage and said second air passage; and said second switching door is rotated in such a manner that said second switching door closes said communication portion when said second opening portion is opened, and said second switching door opens said communication portion when said second opening portion is closed.

6. An air conditioning apparatus according to claim 1, wherein:

each of said first fan and second fan has a cylindrical shape; and said first fan has a height higher than that of said second fan.

7. An air conditioning apparatus according to claim 6, wherein:

said partitioning wall has a communication portion proximate to said second opening portion, for communicating between said first air passage and said second air passage; and said second switching door is rotated in such a manner that said second switching door closes said communication portion when said second opening portion is opened, and said second switching door opens said communication portion when said second opening portion is closed.

8. An air conditioning apparatus according to claim 1, wherein:

each of said first fan and second fan has a cylindrical shape; and said first fan has an outlet angle smaller than that of said second fan.

9. An air conditioning apparatus according to claim 8, wherein:

said partitioning wall has a communication portion proximate to said second opening portion, for communicating between said first air passage and said second air passage; and said second switching door is rotated in such a manner that said second switching door closes said communication portion when said second opening portion is opened, and said second switching door opens said communication portion when said second opening portion is closed.

\* \* \* \* \*

UNITED STATES PATENT AND TRADEMARK OFFICE
CERTIFICATE OF CORRECTION

PATENT NO. : 5,857,905
DATED : January 12, 1999
INVENTOR(S) : Yukio Uemura et al It is certified that error appears in the above-identified patent and that said Letters Patent is hereby corrected as shown below:

Title Page, [56] References Cited, list omitted foreign documents:
-- A-62-29411 2/1987 Japan
A-5-124426 5/1993 Japan--

Col. 2, line 46, delete "an"

Col. 4, line 44, "foot opening portion 19" should be
--foot opening portion 15--

Signed and Sealed this

First Day of February, 2000

Attest:

Attesting Officer

Q. TODD DICKINSON

Acting Commissioner of Patents and Trademarks